US008890777B2

(12) United States Patent
Ryu et al.

(10) Patent No.: US 8,890,777 B2
(45) Date of Patent: Nov. 18, 2014

(54) ORGANIC LIGHT EMITTING DISPLAY AND METHOD OF DRIVING THE SAME

(75) Inventors: Do-Hyung Ryu, Yongin (KR); Dong-Yong Shin, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1052 days.

(21) Appl. No.: 12/659,561

(22) Filed: Mar. 12, 2010

(65) Prior Publication Data

US 2011/0018858 A1 Jan. 27, 2011

(30) Foreign Application Priority Data

Jul. 21, 2009 (KR) ........................ 10-2009-0066288

(51) Int. Cl.
*G06F 3/038* (2013.01)
*G09G 3/32* (2006.01)

(52) U.S. Cl.
CPC ........ *G09G 3/3291* (2013.01); *G09G 2320/043* (2013.01); *G09G 2300/043* (2013.01); *G09G 2300/0842* (2013.01); *G09G 2320/0295* (2013.01); *G09G 3/3233* (2013.01)
USPC ................................................ 345/76; 345/82

(58) Field of Classification Search
CPC .............. G09G 3/3233; G09G 3/3291; G09G 2320/043; G09G 2300/0842; G09G 2320/0295; G09G 2300/043
USPC .......... 345/36, 39, 44–46, 74.1–83, 211–213; 315/169.1–169.4; 313/463
See application file for complete search history.

(56) References Cited

U.S. PATENT DOCUMENTS

| | | | | |
|---|---|---|---|---|
| 7,642,997 | B2 * | 1/2010 | Hamer et al. | 345/76 |
| 2007/0090347 | A1 * | 4/2007 | Park et al. | 257/40 |
| 2008/0030495 | A1 * | 2/2008 | Shirasaki et al. | 345/214 |
| 2008/0180365 | A1 | 7/2008 | Ozaki | |
| 2008/0211397 | A1 * | 9/2008 | Choi | 313/504 |
| 2008/0231562 | A1 | 9/2008 | Kwon | |

(Continued)

FOREIGN PATENT DOCUMENTS

| | | | |
|---|---|---|---|
| KR | 10-2008-0041278 | A | 5/2008 |
| KR | 10-0858615 | B1 | 9/2008 |

(Continued)

OTHER PUBLICATIONS

Korean Office Action in KR 10-2009-0066288, dated Oct. 28, 2011 (Ryu, et al.).

*Primary Examiner* — Amare Mengistu
*Assistant Examiner* — Stacy Khoo
(74) *Attorney, Agent, or Firm* — Lee & Morse, P.C.

(57) ABSTRACT

An organic light emitting display capable of compensating for threshold voltage variations of a driving transistor may include scan and data drivers, pixels, an initial power source unit, a switching unit, a compensating unit, and a timing controller. The scan and data drivers may control current that flows from a first to a second power source via an OLED. The switching unit may selectively couple the initial power source unit to the data driver. The compensating unit may store second data corresponding to a threshold voltage of a driving transistor and may transmit the stored second data to the data driver. The timing controller may transmit the externally supplied first data input to the data driver and may control the scan driver, the data driver, and the compensating unit. The data driver may generate and supply third data signals to the pixels using the first and the second data.

31 Claims, 10 Drawing Sheets

(56) References Cited

U.S. PATENT DOCUMENTS

| | | | | |
|---|---|---|---|---|
| 2008/0238953 | A1* | 10/2008 | Ogura | 345/697 |
| 2008/0252570 | A1* | 10/2008 | Kwon | 345/76 |
| 2009/0027376 | A1* | 1/2009 | Kwon | 345/214 |
| 2009/0051628 | A1* | 2/2009 | Kwon | 345/77 |
| 2009/0109146 | A1* | 4/2009 | Minami et al. | 345/76 |
| 2009/0207160 | A1* | 8/2009 | Shirasaki et al. | 345/212 |

FOREIGN PATENT DOCUMENTS

| | | | |
|---|---|---|---|
| KR | 10 2009-0011638 | A | 2/2009 |
| KR | 10 2009-0053266 | A | 5/2009 |
| KR | 10 2009-0056939 | A | 6/2009 |

* cited by examiner

ORGANIC LIGHT EMITTING DISPLAY AND METHOD OF DRIVING THE SAME

BACKGROUND

1. Field

Embodiments relate to an organic light emitting display and a method of driving the same. More particularly, embodiments relate to an organic light emitting diode displays capable of compensating for a threshold voltage of a driving transistor and a method of driving the same.

2. Description of the Related Art

Recently, various flat panel displays (FPD) capable of reducing weight and volume that are disadvantages of cathode ray tubes (CRT) have been developed. The FPDs include liquid crystal displays (LCD), field emission displays (FED), plasma display panels (PDP), and organic light emitting displays.

Among the FPDs, the organic light emitting displays display images using organic light emitting diodes (OLED) that generate light by re-combination of electrons and holes. Organic light emitting display generally have a relatively high response speed and relatively low power consumption.

Organic light emitting displays may include a plurality of pixels, each of which may emit light. The pixels may include a driving transistor and a light emitting element, e.g., an organic light emitting diode (OLED), and by controlling an amount of current the driving transistor supplied to the OLED, the driving transistor may control a brightness of light emitted from the OLED. However, such an organic light emitting display many not display an image with uniform brightness because a threshold voltage of a driving transistor included in each pixel may vary due to a process deviation. If the driving transistors of each of the pixels included in a display have varying threshold voltages, when data signals corresponding to a same gray scale are supplied to the plurality of pixels, the respective OLEDs associated therewith may emit light of different brightness levels.

To compensate for variations in threshold voltages of driving transistors, it is known to employ pixels including six transistors and one capacitor. However, such additional transistors included in each of the pixels, increase process time and/or decrease yield. In addition, by employing such additional transistors in each of the pixels, overall reliability may decrease as picture quality may decrease due to changing characteristics of each of the six transistors.

SUMMARY

Embodiments are therefore directed to organic light emitting diode displays, which substantially overcome one or more of the problems due to the limitations and disadvantages of the related art.

It is therefore a feature of an embodiment to provide an organic light emitting display capable of compensating for a threshold voltage of a driving transistor while including a minimum and/or reduced number of transistors in a pixel as compared to comparable conventional displays.

It is therefore a separate feature of an embodiment to provide a method of driving an organic light emitting display capable of compensating for a threshold voltage of a driving transistor while including a minimum and/or reduced number of transistors in a pixel as compared to comparable conventional methods of driving organic light emitting displays.

It is therefore a separate feature of an embodiment to provide an organic light emitting display including pixels adapted to compensate for threshold voltage variations of driving transistors while enabling a process time thereof to be reduced, reliability to be improved and/or yield to be improved as compared to comparable conventional displays.

At least one of the above and other features and advantages may be realized by providing an organic light emitting diode display including a scan driver adapted to drive scan lines, a data driver adapted to drive data lines, pixels positioned between the scan lines and the data lines, each of the pixels including a organic light emitting diode (OLED) and a driving transistor, and being adapted to control an amount of current that flows from a first power source to a second power source at a low level via the OLED, an initial power source unit adapted to supply a first voltage, the first voltage being a voltage, which when supplied to the driving transistors, turns the driving transistors on, a switching unit adapted to selectively couple the initial power source unit to the data driver, a timing controller adapted to transmit externally supplied first data to the data driver, and a compensating unit adapted to store second data corresponding to a threshold voltage of the driving transistor and to transmit the stored second data to the data driver, wherein the timing controller is adapted to control the scan driver, the data driver, and the compensating unit, and the data driver is adapted to generate a third data signal supplied to the pixels using the first data and the second data.

The initial power source unit may include at least one initial power source adapted to supply the first voltage.

The compensating unit may include first switching elements coupled to the data lines, at least one voltage sensing unit coupled to the first switching elements, the voltage sensing unit being adapted to sense a voltage applied to the data lines, at least one subtracting unit coupled to the first switching elements and the voltage sensing unit, the subtracting unit being adapted to subtract the voltage applied to the data lines from the first power source when a control signal is input from the voltage sensing unit, an analog digital converter (ADC) adapted to convert a voltage supplied from the subtracting unit into second data, and a memory adapted to store the second data from the ADC.

The first switching elements may be turned on during a portion of a sensing period when the second data is stored and may be turned off during a driving period when a respective predetermined gray scale is displayed by the pixels.

The organic light emitting display may be adapted to perform at least one sensing period before the organic light emitting display displays an image based on the externally supplied first data.

The voltage sensing unit may be adapted to sense the voltage applied to the data lines at predetermined points in time and, when a voltage sensed at a previous point of time and a voltage sensed at a current point of time are determined to be a same voltage value, and to generate the control signal.

The subtracting unit may be adapted to subtract the voltage applied to the data lines from a voltage of the first power source and to supply the threshold voltage of the respective driving transistor to the ADC.

The second data corresponding to the pixels is stored in the memory during the sensing period.

The memory is adapted to supply the second data to the data driver in units of horizontal lines corresponding to the control of the timing controller.

The display may further include control lines extending parallel with the scan lines and being controlled by the scan driver, and power source lines extending parallel with the scan lines and being controlled by a power source line driver.

The scan driver may be adapted to sequentially supply respective scan signals to the scan lines during a sensing period when the second data is stored and during a driving period when a predetermined gray scale is respectively displayed by the pixels, and to sequentially supply respective control signals to the control lines during the sensing period in synchronization with the scan signals.

The scan driver may be adapted to not supply the control signals during the driving period.

The power source line driver may be adapted to supply a voltage of a second power source having a high level to the power source lines during the sensing period and to supply a voltage of the second power source having a low level to the power source lines during the driving period.

The voltage of the second power source at the high level may be set to prevent current flow to the OLED.

The voltage of the second power source at the high level may be set to have a same voltage value as the first power source.

The switching unit may include second switching elements coupled between the data lines and the data driver, and third switching elements coupled between the data lines and the initial power source unit.

The second switching elements may be turned off during the respective sensing period and are turned on during the respective driving period.

The third switching elements may be turned on during a first period of the respective sensing period during a period when the respective scan signal is supplied and are turned off during the driving period.

The first switching elements may be turned on during a second period of the respective sensing period, excluding the first period, when the respective scan signal is supplied.

The second period may be set to have a larger width than the first period.

The data driver may include a first signal generating unit adapted to generate a first data signal using the first data, a second signal generating unit adapted to generate a second data signal using the second data, and an adding unit adapted to add corresponding ones of the first data signal and the second data signal and to generate the third data signal, respectively.

The first data signal generated from the first data to be supplied to a respective pixel and the second data signal generated by the second data extracted from the respective pixel may be added by the adding unit.

The data driver may further include a shift register unit adapted to sequentially generate sampling signals, a first sampling latch unit adapted to store the first data based on the sampling signals, a second sampling latch unit for storing the second data based on the sampling signals, a first holding latch unit adapted to simultaneously receive and store the first data stored in the first sampling latch unit and to supply the stored first data to the first signal generating unit, and a second holding latch unit adapted to simultaneously receive and store the second data stored in the second sampling latch unit and to supply the stored second data to the second signal generating unit.

The data driver may further include a buffer unit coupled between the adding unit and the data lines, the buffer unit being adapted to supply the respective third data signal to the data lines.

Each of the pixels may include a first transistor including a first terminal coupled the corresponding data line and a second terminal coupled to the driving transistor, the first transistor being turned on when a scan signal is supplied to the corresponding scan line, a third transistor coupled between the corresponding data line and a common terminal of the driving transistor and the OLED and being turned on when a control signal is supplied to the corresponding control line, and a storage capacitor coupled between a gate electrode of the driving transistor and the first power source, wherein the driving transistor may be coupled between the first power source and the OLED so that the gate electrode of the driving transistor is coupled to a second electrode of the first transistor.

The display may further include control lines and emission control lines extending parallel to the scan lines and controlled by the scan driver.

The scan driver may be adapted to sequentially supply scan signals to the respective scan lines during a sensing period when the second data is stored and during a driving period when a respective predetermined gray scale is displayed by the pixels and to sequentially supply emission control signals to the emission control lines during the sensing period in synchronization with the scan signals.

Each of the pixels may include a first transistor including a first terminal coupled the corresponding data line and a second terminal coupled to the driving transistor, the first transistor being turned on when a scan signal is supplied to the corresponding scan line, a third transistor coupled between the data line and a common terminal of the driving transistor, the third transistor being turned on when a control signal is supplied to the control line, a fourth transistor coupled between the common terminal of the driving transistor and the OLED, the fourth transistor being turned off when an emission control signal is supplied to the corresponding emission control line, and being turned on when the emission control signal is not supplied, and a storage capacitor coupled between a gate electrode of the driving transistor and the first power source, wherein the driving transistor is coupled between the first power source and the OLED so that the gate electrode of the driving transistor is coupled to a second electrode of the first transistor.

At least one of the above and other features and advantages may be separately realized by providing a method of driving an organic light emitting display including a pixel for generating light having a brightness corresponding to an amount of current flow from a first power source to a second power source via an organic light emitting diode (OLED), the method including coupling a driving transistor included in the pixel in a form of a diode, extracting a threshold voltage of the driving transistor using a voltage applied to a gate electrode of the driving transistor when the driving transistor is turned off, converting the threshold voltage of the driving transistor into second data and storing the second data in a memory, and displaying a predetermined image in the pixel using externally supplied first data supplied and the second data.

Extracting a threshold voltage of the driving transistor using a voltage applied to a gate electrode of the driving transistor when the driving transistor is turned off may include sensing a voltage applied to a gate electrode of the driving transistor at predetermined times, and subtracting the voltage applied to the gate electrode of the driving transistor from the first power source to extract the threshold voltage of the driving transistor when it is determined that a voltage sensed at a previous point of time is a same as a voltage sensed at a current point of time.

Displaying a predetermined image in the pixel using externally supplied first data and the second data may include generating a first data signal using the first data, generating a second data signal using the second data, adding the first data signal and the second data signal to generate a third data signal, and supplying the third data signal to the pixel.

The first data signal generated by the first data to be supplied to a respective pixel may be added to the second data signal generated by the second data extracted from the respective pixel to generate the third data signal.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
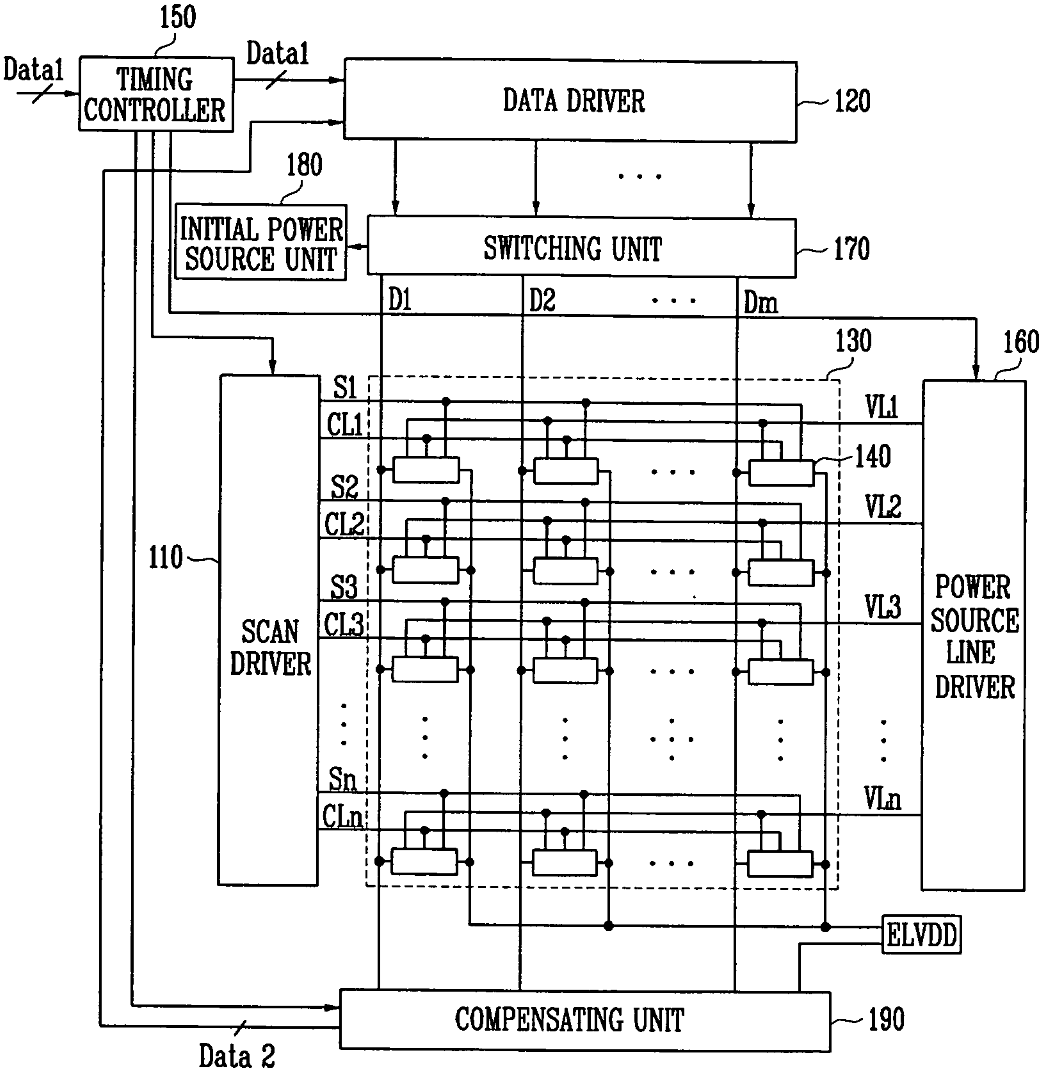
FIG. 1 illustrates a schematic diagram of an exemplary embodiment of an organic light emitting display.

Korean Patent Application No. 10-2009-0066288, filed on Jul. 21, 2009, in the Korean Intellectual Property Office, and entitled: “Organic Light Emitting Display Device and Driving Method Thereof” is incorporated by reference herein in its entirety.

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

It will also be understood that when a first element is described as being coupled to a second element, unless noted otherwise, the first element may be directly coupled to the second element and/or indirectly coupled to the second element via one or more other elements. Further, elements that are not essential to the complete understanding of the invention may be omitted for clarity. Like reference numerals refer to like elements throughout the specification.

FIG. 1 illustrates a schematic diagram of an exemplary embodiment of an organic light emitting display.

Referring to FIG. 1, the organic light emitting display may include a pixel unit 130, scan lines S1 to Sn, data lines D1 to Dm, control lines CL1 to CLn, power source lines VL1 to VLn, a scan driver 110, a data driver 120, a timing controller 150, a power source line driver 160, a switching unit 170, an initial power source unit, and a compensating unit 190.

The scan driver 110 may drive the scan lines S1 to Sn and the control lines CL1 to CLn. The power source line driver 160 may drive the power source lines VL1 to VLn. The data driver 120 may drive the data lines D1 to Dm. The initial power source unit 180 may supply a voltage of an initial power source to the pixels 140. The switching unit 170 may selectively couple the initial power source unit 180 and the data driver 120 to the data lines D1 to Dm. The compensating unit 190 may extract threshold voltages of driving transistors included in the pixels 140. The compensating unit 190 may store the extracted threshold voltages. The timing controller 150 may control the scan driver 110, the data driver 120, the power source line driver 160, and the compensating unit 190.

The pixel unit 130 may include pixels 140 positioned at intersections between respective ones of the scan lines S1 to Sn and the data lines D1 to Dm. The pixels 140 may be arranged in a matrix pattern. The scan lines S1 to Sn and the control lines CL1 to CLn may extend parallel to each other along a row direction. The data lines D1 to Dm may extend along a direction crossing the scan lines S1 to Sn and the control lines CL1 to CLn, e.g., along a column direction. The pixels 140 may receive a first power source ELVDD, which may be externally supplied, and a second power source ELVSS from the power source lines VL1 to VLn. The pixels 140 that receive the first power source ELVDD and the second power source ELVSS may control, based on data signals, an amount of current supplied from the first power source ELVDD to the second power source ELVSS via organic light emitting diodes (OLEDs). Then, light with predetermined brightness may be respectively generated by the OLEDs.

The scan driver 110 may drive the scan lines S1 to Sn and the control lines CL1 to CLn based on signals from the timing controller 150. The scan driver 110 may sequentially supply scan signals to the scan lines S1 to Sn during a sensing period and a driving period. The scan driver 110 may sequentially supply control signals to the control lines CL1 to CLn during the sensing period. The scan signals and the control signals may be set at a voltage, at which transistors included in the pixel unit 130 may be turned on. For example, the scan signals and the control signals may be set at a voltage having a low level.

The data driver 120 may supply data signals to the data lines D1 to Dm based on signals from the timing controller 150.

The switching unit 170 may selectively couple the initial power source unit 180 and the data driver 120 to the data lines D1 to Dm. The switching unit 170 may include at least one switching element in, e.g., each column.

The power source line driver 160 may supply a voltage from the second power source ELVSS having a high or low level to the power source lines VL1 to VLn. During the sensing period, the power source line driver 160 may sequentially supply a voltage of the second power source ELVSS having a high level to the power source lines VL1 to VLn in synchronization with the scan signals. During the driving period, the power source line driver 160 may supply a voltage of the second power source ELVSS having a low level to the power source lines VL1 to VLn.

A voltage of the second power source ELVSS at the low level may be set to be lower than a voltage of the first power source ELVDD. A voltage of the second power source ELVSS at the high level may be set to be the same as a voltage at which current does not flow through the OLEDs included in the pixels 140, e.g., may be a high voltage of the first power source ELVDD.

The compensating unit 190 may extract the threshold voltages of the driving transistors included in the pixels 140 during the sensing period and may store second data corresponding to the extracted threshold voltages. During the driving period, the compensating unit 190 may supply the second data to the data driver 120 in accordance with the timing controller 150.

The timing controller 150 may control the data driver 120, the scan driver 110, the power source line driver 160, and the compensating unit 190. The timing controller 150 may transmit first data Data1 to the data driver 120. The first data Data1 may be externally supplied to the timing controller 150.

Figure 2:
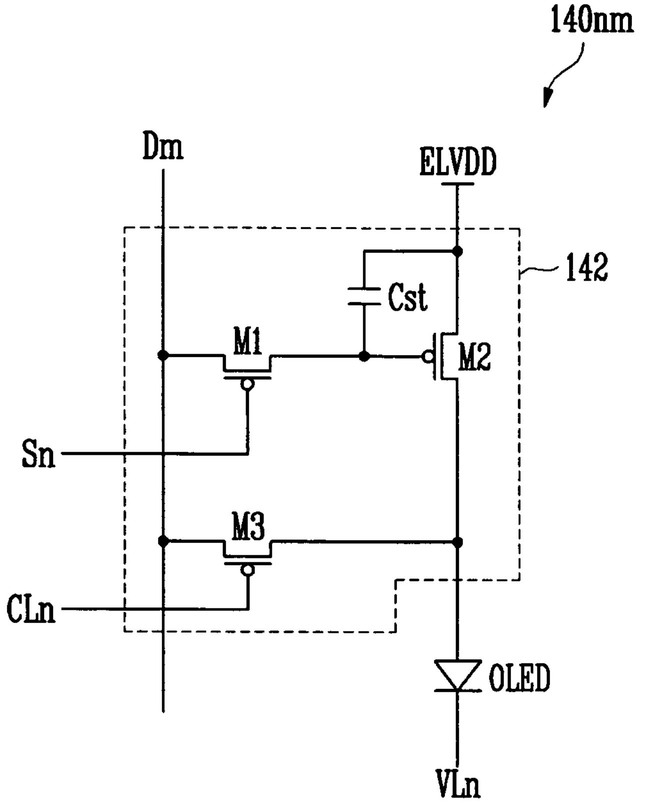
FIG. 2 illustrates a schematic diagram of an exemplary embodiment of a pixel employable by the organic light emitting display of FIG. 1.

FIG. 2 illustrates a schematic diagram of an exemplary embodiment of a pixel 140*nm* employable by the organic light emitting display of FIG. 1. While the exemplary pixel 140*nm* is illustrated as corresponding to the pixel 140 connected to the nth scan line Sn and the mth data line Dm, features of the pixel 140*nm* illustrated FIG. 2 may be employed, e.g., for one, some or all of the pixels 140 of the organic light emitting display of FIG. 1.

Referring to FIG. 2, in some embodiments, the pixel 140*nm* may include an OLED and a pixel circuit 142 for supplying current to the OLED. The pixel circuit 142 may include a first transistor M1, a second transistor M2 and a third transistor M3, and a storage capacitor Cst.

An anode electrode of the OLED may be coupled to the pixel circuit 142 and a cathode electrode of the OLED may be coupled to the power source line VLn. The OLED may generate light with predetermined brightness corresponding to the current supplied from the pixel circuit 142.

During the sensing period, the pixel circuit 142 may supply a voltage corresponding to a threshold voltage of the second transistor M2 to the compensating unit 190. During the driving period, the pixel circuit 142 may supply the current corresponding to the data signal to the OLED.

A gate electrode of the first transistor M1 may be coupled to the scan line Sn, a first electrode of the first transistor M1 may be coupled to the data line Dm, and a second electrode of the first transistor M1 may be coupled to a first terminal of the storage capacitor Cst. The first transistor M1 may be turned on when the scan signal is supplied to the scan line Sn, e.g., when the scan signal has a low level.

A gate electrode of the second transistor M2 may be coupled to the first terminal of the storage capacitor Cst and a first electrode of the second transistor M2 is coupled to a second terminal of the storage capacitor Cst and the first power source ELVDD. A second terminal of the second transistor M2 may be coupled to the anode of the OLED. The second transistor M2 may control an amount of the current supplied from the first power source ELVDD to the power source line VLn, i.e., the second power source ELVSS having a low level, via the OLED corresponding to a voltage stored in the storage capacitor Cst. The OLED may generate light having a brightness corresponding to the amount of the current supplied from the second transistor M2.

A gate electrode of the third transistor M3 may be coupled to the control line CLn, a first electrode of the third transistor M3 may be coupled to the second electrode of the second transistor M2, and a second electrode of the third transistor M3 may be coupled to the data line Dm. The third transistor M3 may be turned on when a control signal is supplied to the control line CLn, e.g., when the control signal has a low level, and may be turned off when the control signal is not supplied, e.g., when the control signal has a high level.

Figure 3:
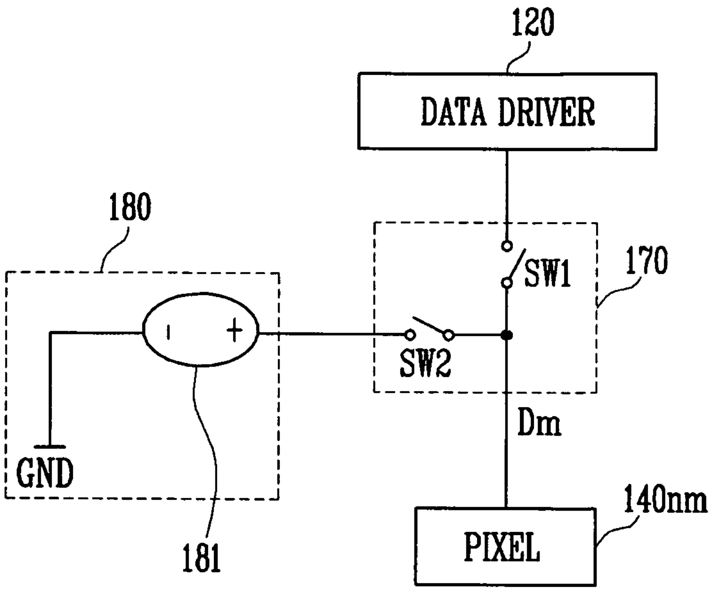
FIG. 3 illustrates a schematic diagram of an exemplary embodiment of an initial power source unit and a switching unit employable by the organic light emitting display of FIG. 1.

FIG. 3 illustrates a schematic diagram of an exemplary embodiment of the initial power source unit 180 and the switching unit 170 employable by the organic light emitting display of FIG. 1. The pixel 140*nm* of FIG. 2 that is coupled to the mth data line Dm will be employed as an exemplary one of the pixels 140 in the following description.

Referring to FIG. 3, the initial power source unit 180 may include at least one initial power source 181. A voltage of the initial power source 181 supplied to the pixels 140 during the sensing period may be set at a voltage at which the second transistor M2 may be turned on. For example, the initial power source 181 may be set at a voltage value smaller than a voltage value obtained by subtracting a threshold voltage of the second transistor M2 from a voltage of the first power source ELVDD.

The switching unit 170 may include a first switching element SW1 and a second switching element SW2.

The first switching element SW1 may be positioned between the data line Dm and the data driver 120. The first switching element SW1 associated with each column of the pixels 140 may be turned off during the sensing period and may be turned on during the driving period.

The second switching element SW2 may be positioned between the initial power source unit 180 and the data line Dm. The second switching element SW2 may be turned on during a portion of the sensing period and may be turned off during the driving period. When a single initial power source 181 is included in the initial power source unit 180, a single second switching element SW2 may be provided to be commonly coupled to the data lines D1 to Dm. However, embodiments are not limited thereto. For example, in some embodiments, each column may be associated with a response one of the second switching elements SW2. That is, e.g., in embodiments, at least one second switching element SW2 may be provided in the switching unit 170.

Figure 4:
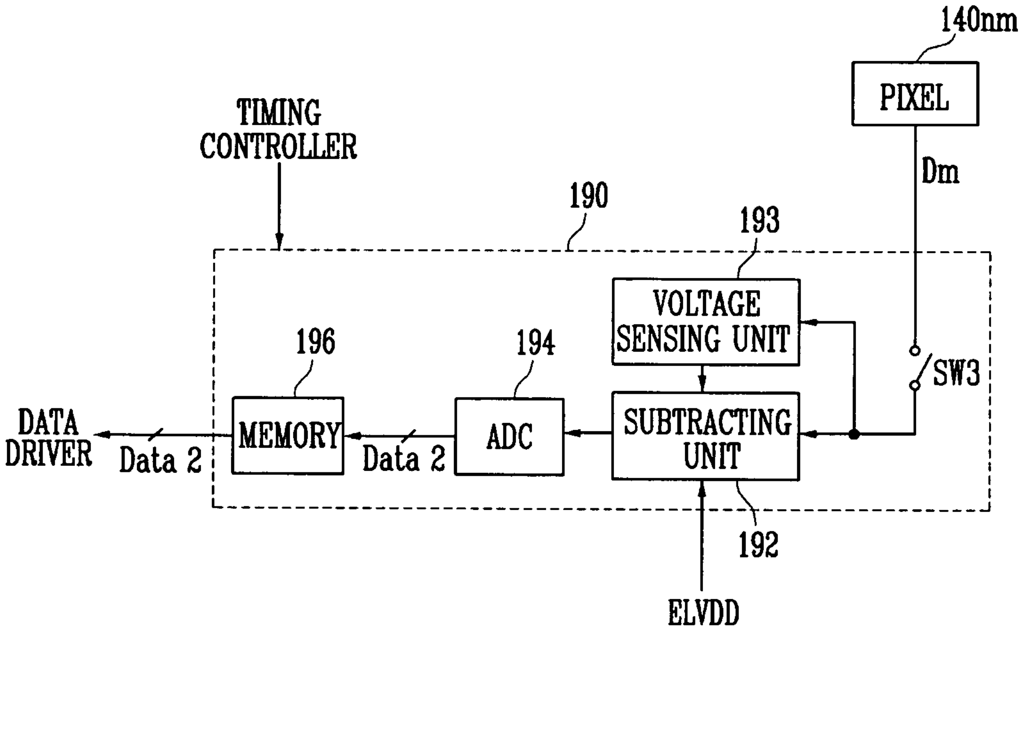
FIG. 4 illustrates a schematic diagram of an exemplary embodiment of a compensating unit employable by the organic light emitting display of FIG. 1.

FIG. 4 illustrates a schematic diagram of an exemplary embodiment of the compensating unit 190 employable by the organic light emitting display of FIG. 1. In the following description, the pixel 140*nm* of FIG. 2 that is coupled to the mth data line Dm will be employed as an exemplary one of the pixels 140.

Referring to FIG. 4, the compensating unit 190 may include at least one third switching element SW3 coupled to the mth data line Dm, at least one subtracting unit 192, a voltage sensing unit 193 coupled to the third switching element SW3, at least one analog digital converter (hereinafter, referred to as ADC) 194 coupled to the subtracting unit 192, and a memory 196 coupled between the ADC 194 and the data driver 120.

The third switching element SW3 may be positioned between the subtracting unit 192 and the data line Dm. Each column of the pixels 140 may be associated with a respective one of the third switching elements SW3, and the third switching element SW3 of each channel may be turned on during a portion of the sensing period. A time period when the third switching element SW3 is on during the sensing period may not overlap a time period when the second switching element SW2 is turned on during the same sensing period.

The voltage sensing unit 193 may sense a voltage, in units of predetermined time, during a period when the third switching element SW3 is turned on. The voltage sensing unit 193 may supply a control signal to the subtracting unit 192 when a voltage does not change between a first point in time, e.g., a previous point in time, and a second point in time, e.g., a current point in time, after the first point in time.

The subtracting unit 192 may subtract a voltage supplied from the data line Dm from the voltage of the first power source ELVDD, and may supply a subtraction result to the ADC 194 when the corresponding control signal is supplied. The voltage obtained by subtracting the voltage supplied from the data line Dm from the voltage of the first power source ELVDD may correspond to a threshold voltage of the second transistor M2 included in the pixel 140*nm*. Therefore, the threshold voltage of the second transistor M2 of the respective pixel 140*nm* may be supplied to the ADC 194.

In some embodiments, at least one subtracting unit 192 may be included in the organic light emitting display, and, more particularly, in the compensating unit 190. For example, when one subtracting unit 192 is provided, the subtracting unit 192 may be commonly coupled to the third switching elements SW3 positioned, e.g., along each of the columns of pixels 140. In such embodiments, the third switching elements SW3 may be sequentially turned on to supply a voltage applied to the data lines D1 to Dm to the subtracting unit 192. Embodiments are not limited thereto. For example, in some embodiments, the subtracting unit 192 may be provided along each column of the pixels 140. In such embodiments, the third switching elements SW3 may be simultaneously turned on to supply a respective voltage applied to the data lines D1 to Dm to the subtracting unit 192.

The ADC 194 may convert respective threshold voltages of driving transistors included in the pixels 140. The respective threshold voltages of the driving transistors included in the pixels 140 may be supplied from the subtracting unit 192, and may be converted into digital signals, i.e., the second data Data2, and may supply converted second data Data2 to the memory 196.

The memory 196 may store the second data Data2, which may be supplied from the ADC 194. During the sensing period, the memory 196 may store the second data Data2, which may correspond to threshold voltages of the second transistors M2 included in the pixels 140. The memory 196 may supply the second data Data2 to the data driver 120 in units of horizontal lines in accordance with the timing controller 150.

Figure 5:
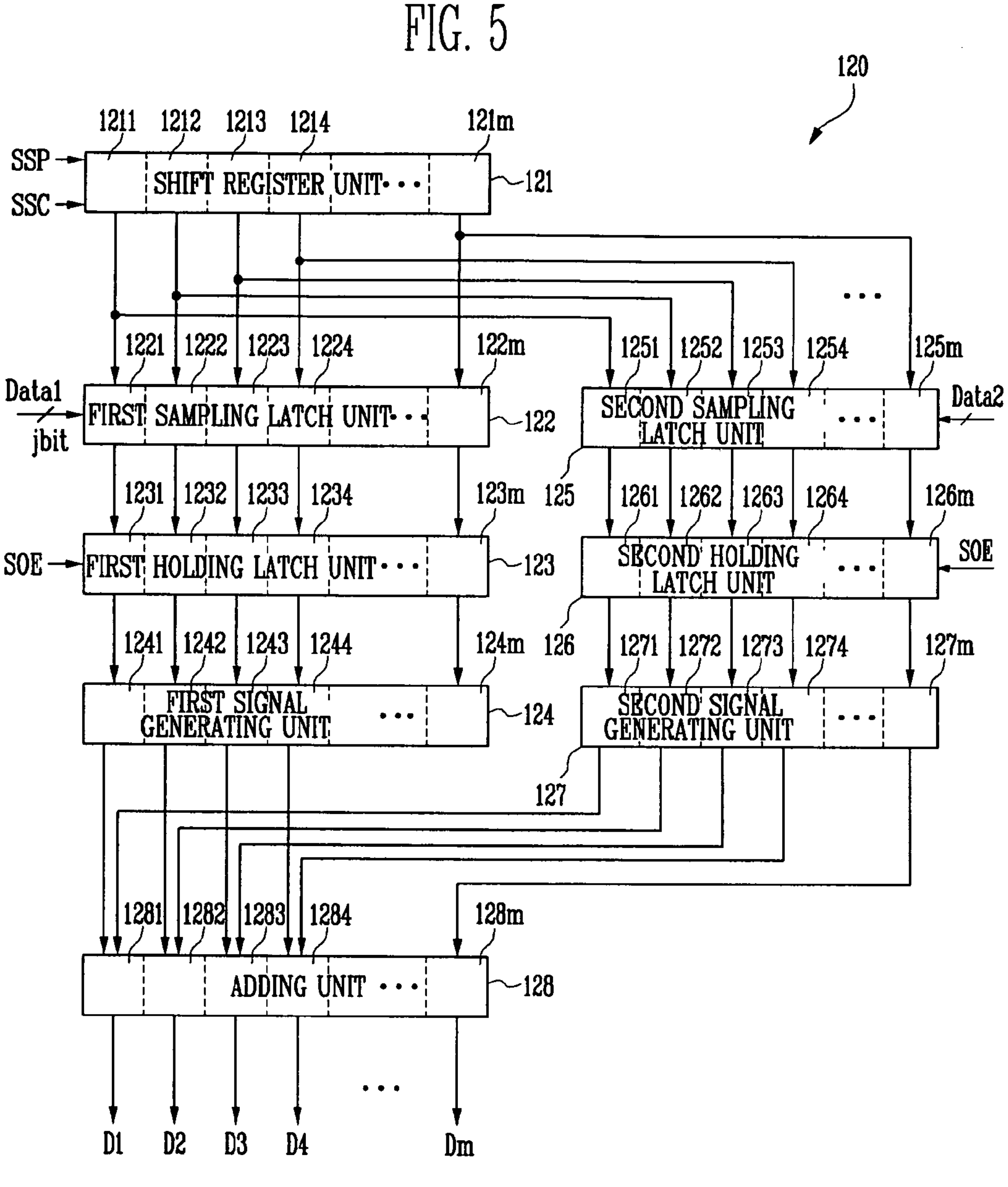
FIG. 5 illustrates a schematic diagram of an exemplary embodiment of a data driver employable by the organic light emitting display of FIG. 1.

FIG. 5 illustrates a schematic diagram of an exemplary embodiment of the data driver 120 employable by the organic light emitting display of FIG. 1.

Referring to FIG. 5, the data driver 120 may include a shift register unit 121, first and second sampling latch units 122, 125, first and second holding latch units 123,126, first and second signal generating units 124 and 127, and an adding unit 128.

The shift register unit 121 may receive a source start pulse SSP and a source shift clock SSC from the timing controller 150. The shift register 121 that received the source shift clock SSC and the source start pulse SSP may shift the source start pulse SSP every one period of the source shift clock SSC to sequentially generate m sampling signals. The shift register unit 121 may include m shift registers 1211 to 121*m*, which may respectfully correspond to the m sampling signals.

The first data Data1 may be supplied to the first sampling latch unit 122 of the data driver 120 from the timing controller 150. The first sampling latch unit 122 may sequentially store the first data Data1 in response to the m sampling signals sequentially supplied from the shift register unit 121. The first sampling latch unit 122 may include m first sampling latches 1221 to 122*m*, which may respectfully store the m first data Data1 corresponding to the m data lines D1 to Dm.

The second data Data2 may be supplied to the second sampling latch unit 125 of the data driver 120 from the compensating unit 190. The second sampling latch unit 125 may sequentially store the second data Data2 in response to the m sampling signals sequentially supplied from the shift register unit 121. The second sampling latch unit 122 may include m second sampling latches 1251 to 125*m* in order to store the m second data Data2.

When, e.g., the first data Data1 stored in a jth (j is a natural number) first sampling latch 122*j* is supplied to a corresponding pixel, e.g., an xth pixel in the jth column 140*xj*, the second data Data2 extracted from the specific pixel may be stored in the jth second sampling latch 125*j*.

The first holding latch unit 123 may receive a source output enable SOE signal from the timing controller 150. When the first holding latch unit 123 receives the source output enable SOE signal and the first data Data1 from the first sampling latch unit 122, the first holding latch unit 123 may store the received first data Data1. The first holding latch unit 123 may supply the first data Data1 stored therein to the first signal generating unit 124. The first holding latch unit 123 may include m first holding latches 1231 to 123*m*.

The second holding latch unit 126 may receive the source output enable SOE signal from the timing controller 150. When the second holding latch unit 126 receives the source output enable SOE signal and the second data Data2 from the second sampling latch unit 125, the second holding latch unit 126 may store the received second data Data2. The second holding latch unit 126 may supply the second data Data2 stored therein to the second signal generating unit 127. The second holding latch unit 126 may include m second holding latches 1261 to 126*m*.

The first signal generating unit 124 may receive the first data Data1 from the first holding latch unit 123 and may generate m first data signals corresponding to the received first data Data1. The signal generating unit 124 may include m first digital analog converters (hereinafter, referred to as DAC) 1241 to 124*m*. The first signal generating unit 124 may generate the m first data signals using the first DACs 1241 to 124*m*, which may be respectively arranged in each of the columns of the pixels 140, and may supply the generated first data signals to the adding unit 128.

The second signal generating unit 127 may receive the second data Data2 from the second holding latch unit 126 and may generate the m second data signals corresponding to the received second data Data2. The second signal generating unit 127 may include m second DACs 1271 to 127*m*. The second signal generating unit 127 may generate the m second data signals using the second DACs 1271 to 127*m*, which may be respectively arranged in each of the columns of the pixels 140, and may supply the generated second data signals to the adding unit 128.

The adding unit 128 may add the first data signals and the second data signals, and may generate third data signals. The adding unit 128 may supply the generated third data signals to the data lines D1 to Dm. Therefore, the adding unit 128 may include m adders 1281 to 128*m*. The adders 1281 to 128*m* may respectively add corresponding ones of the generated first data signals and the generated second data signals to be supplied to the pixels, respectively, and may generate the third data signals.

Figure 6:
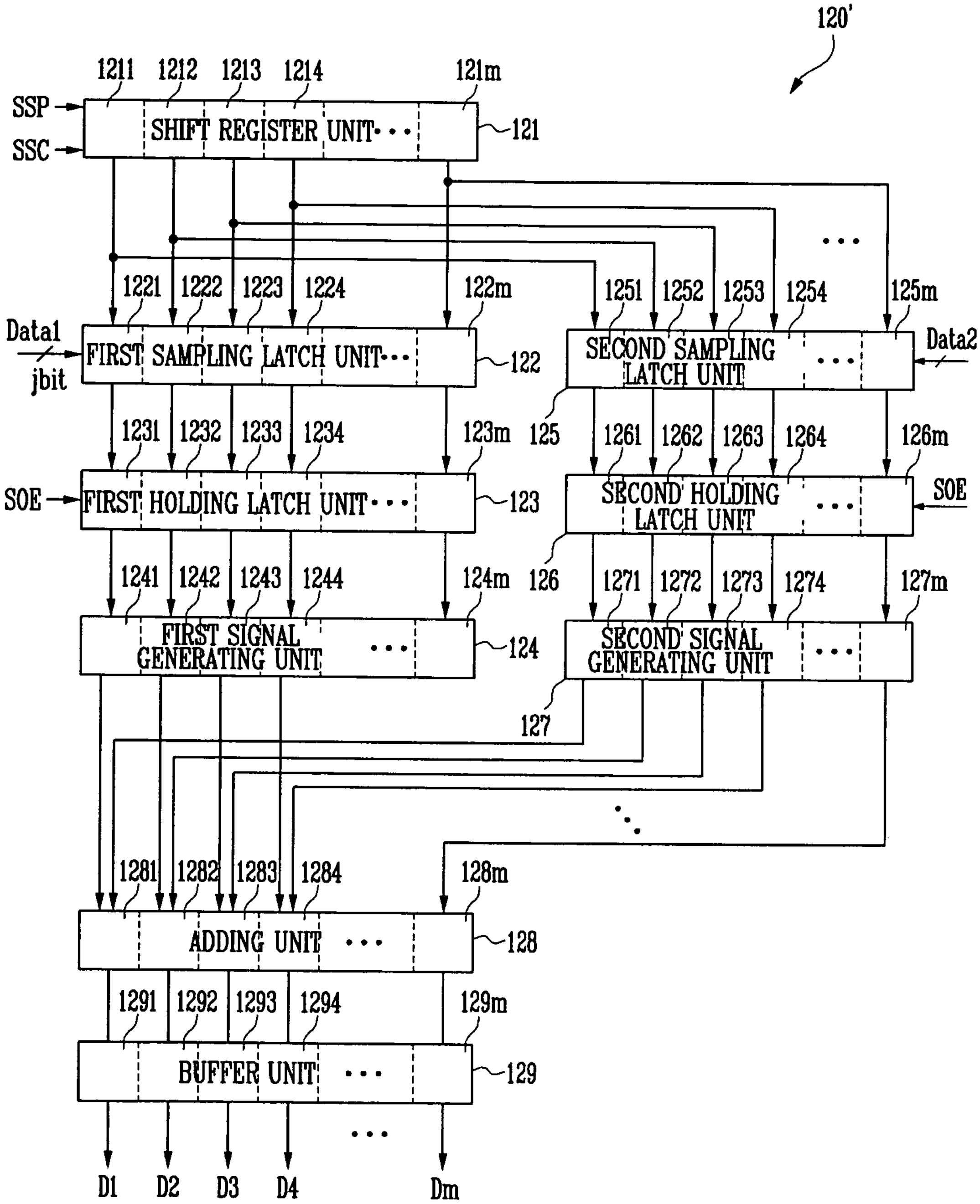
FIG. 6 illustrates a schematic diagram of second exemplary embodiment of the data driver employable by the organic light emitting display of FIG. 1.

Embodiments of the data driver 120 are not limited to the exemplary embodiment illustrated in FIG. 5. FIG. 6 illustrates a schematic diagram of a second exemplary embodiment of the data driver 120' employable by the organic light emitting display of FIG. 1. The data driver 120' of FIG. 6 may substantially correspond to the data driver 120 of FIG. 5. Thus, only differences between the exemplary embodiment of the data driver 120 of FIG. 5 and the exemplary embodiment of the data driver 120' FIG. 6 will be described. Referring to FIG. 6, the data driver 120' may include a buffer unit 129 between the adding unit 128 and the data lines D1 to Dm. The buffer unit 129 may, supply the m third data signals supplied from the adding unit 128 to the m data lines D1 to Dm, respectively. The buffer unit 129 may include m buffers 1291 to 129*m*.

Figure 7:
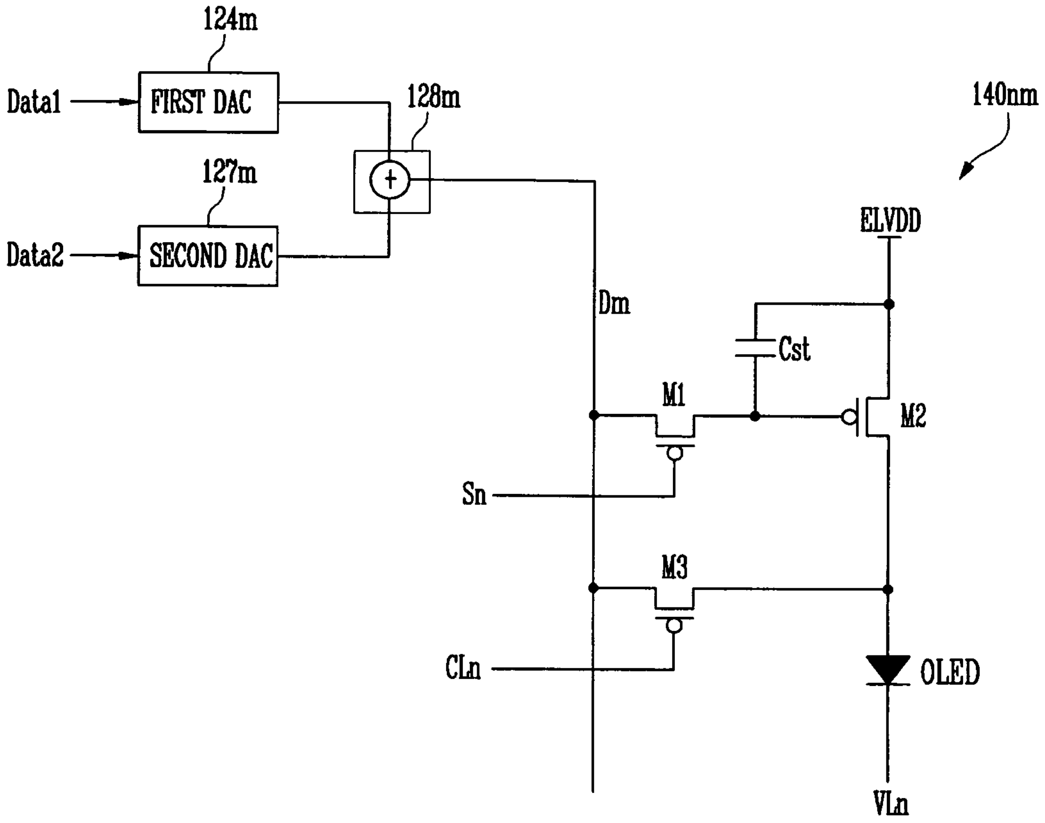
FIG. 7 illustrates a schematic diagram of a principle of compensating for a threshold voltage employable by embodiments.

FIG. 7 illustrates a schematic diagram of a principle of compensating for a threshold voltage employable by embodiments. In the following description, the pixel 140*nm* of FIG. 2 that is coupled to the mth data line Dm will be employed as an exemplary one of the pixels 140.

Referring to FIG. 7, the first data Data1 to be supplied to the pixel 140*nm* may be stored in the first DAC 124*m*. The first DAC 124*m* may convert the first data Data1 into the corresponding first data signal and may supply the first data signal to the corresponding adder 128*m*. A brightness realized by the pixel 140*nm* may be determined by the corresponding first data signal.

The second data Data2 extracted from the corresponding pixel 140*nm* may be stored in the second DAC 127*m*. The second DAC 127*m* may convert the second data Data2 into the corresponding second data signal, and may supply the corresponding second data signal to the adder 128*m*.

The adder 128*m* may add the corresponding first data signal and the corresponding second data signal, and may generate the corresponding third data signal. The adder 128*m* may be an analog adder.

The third data signal generated by the adder 128*m* may be supplied to the pixel 140*nm* via the data line Dm. The current supplied to the corresponding OLED of the pixel 140*nm* may be determined by Equation 1.

$$Ioled=k(ELVDD-V\text{data3}-Vth)^2 \quad \text{[EQUATION 1]}$$

In Equation 1, k represents a constant, Vdata3 represents a voltage value of the third data signal, and Vth represents the threshold voltage of the second transistor M2.

In embodiments, the threshold voltage of the second transistor M2 may be included in Vdata3. Therefore, in embodiments, the current that flows through the pixel 140*nm* may be determined by Equation 2.

$$Ioled=k(ELVDD-V\text{data1})^2 \quad \text{[EQUATION 2]}$$

In Equation 2, Vdata1 represents a voltage value of the first data signal.

Referring to Equation 2, in embodiments, the current that flows to the corresponding OLED may be determined by the first data signal generated by the first data Data1 regardless of the threshold voltage of the corresponding second transistor M2.

By enabling a respective current that flows to each pixel, e.g., 140*nm*, of a display to be determined irrespective of a threshold voltage of a corresponding driving transistor, e.g., corresponding second transistors M2, of the respective pixel, embodiments may enable an image with uniform brightness to be displayed.

By employing pixels, e.g., 140, which may only include three transistors M1 to M3, embodiments may enable a process time of an organic light emitting displays to be reduced and/or a yield of organic light emitting displays to be improved.

By employing pixels, e.g., 140, which may include a small number, e.g., three transistors M1 to M3, embodiments may provide organic light emitting display having improved reliability.

Figure 8:
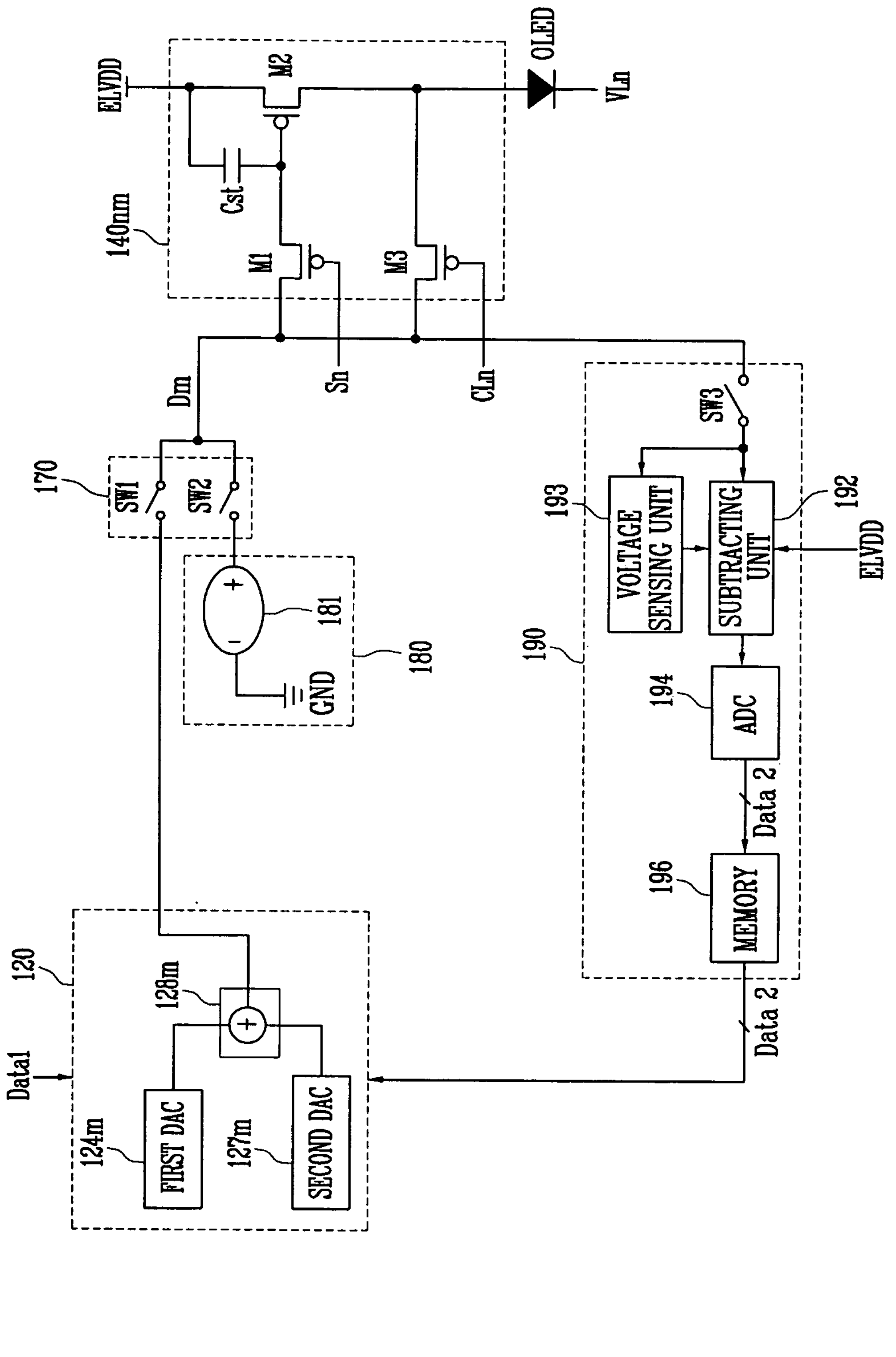
FIG. 8 illustrates a schematic diagram of an exemplary embodiment of a coupling relationship among exemplary embodiments of a compensating unit, a switching unit, an initial power source unit, and a data driver of the organic light emitting display of FIG. 1.
Figure 9A:
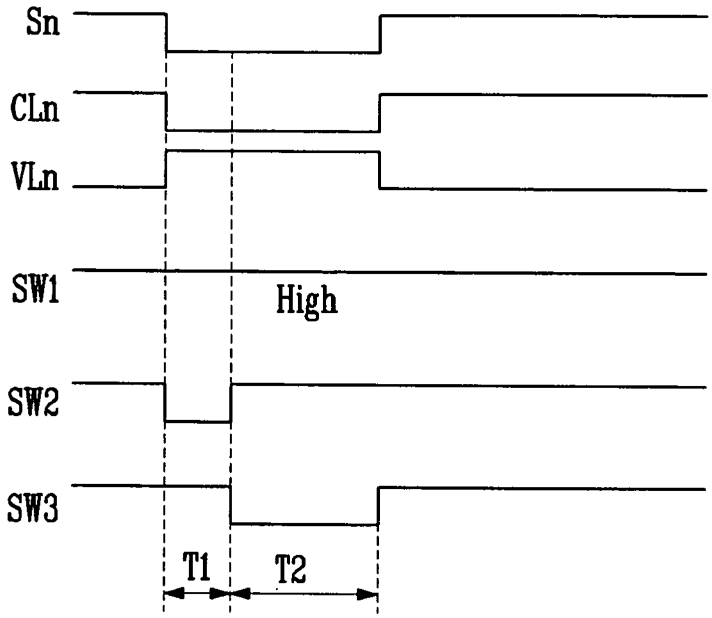
FIG. 9A illustrates a timing diagram of exemplary driving waveforms employable during a sensing period.
Figure 9B:
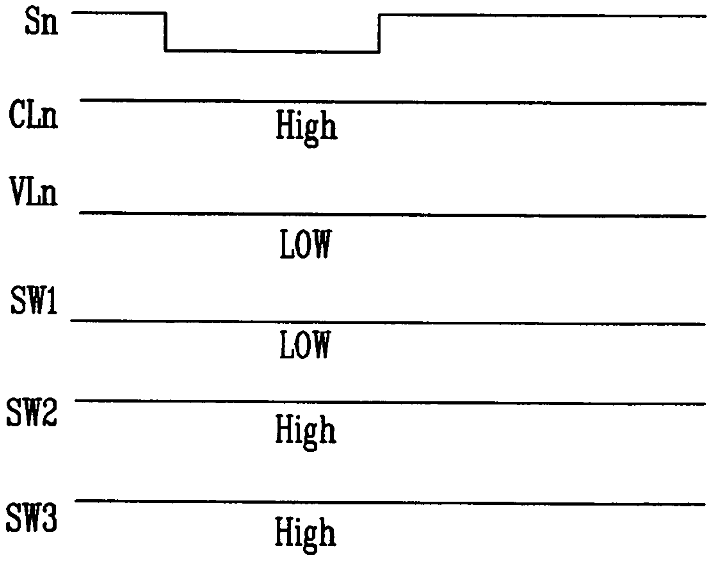
FIG. 9B illustrates a timing diagram of exemplary driving waveforms employable during a driving period.
Figure 10:
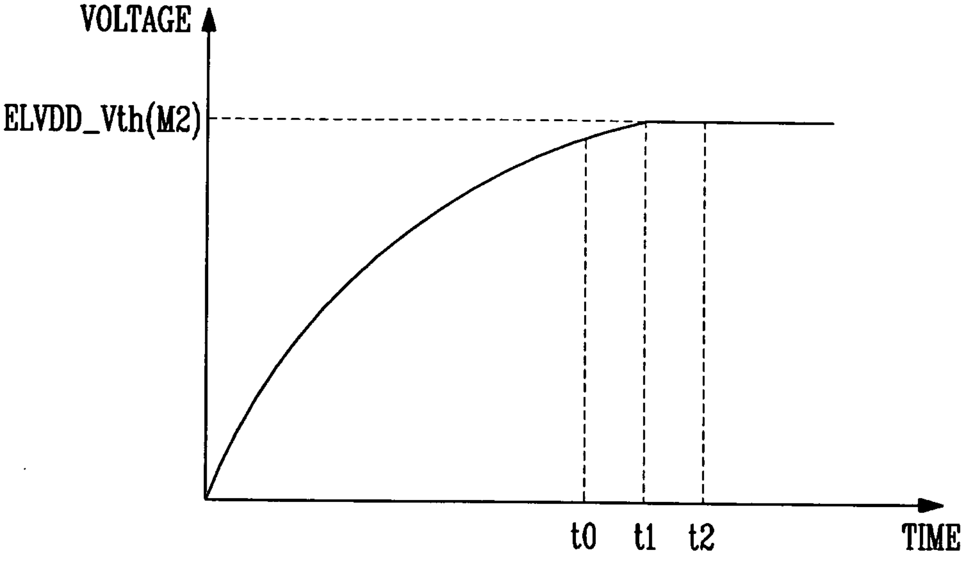
FIG. 10 illustrates a graph of characteristics of a voltage that may be supplied to a driving transistor during a sensing period.

FIG. 8 illustrates an exemplary embodiment of a coupling relationship among the compensating unit 190, the switching unit 170, the initial power source unit 180, and the data driver 120 of the exemplary display of FIG. 1. FIG. 9A illustrates a timing diagram of exemplary driving waveforms employable during a sensing period employable for driving the display of FIG. 1. FIG. 9B illustrates a timing diagram of exemplary driving waveforms employable during a driving period employable for driving the display of FIG. 1. FIG. 10 illustrates a graph of characteristics of a voltage that may be supplied to a driving transistor during a sensing period employable for driving the display of FIG. 1.

In FIG. 8, the pixel 140*nm* of FIG. 2 that is coupled to the mth data line Dm will be employed as an exemplary one of the pixels 140. Only core components of the data driver 120 may be illustrated in FIG. 8.

In embodiments, at least one sensing period may be included before the organic light emitting display is used. For example, information on the threshold voltages of the driving transistors included in the pixels 140 of the display may be stored in the compensating unit 190 through the sensing period before the organic light emitting display displays an image corresponding to an externally supplied data signal Data1. In embodiments, the sensing period may be designated by a user.

Features of the exemplary sensing period will be described in detail with reference to FIGS. 8 and 9A. First, a respective control signal may be supplied, e.g., control signal may be at a low level, to the control line CLn so that the corresponding scan signal may be supplied, e.g., scan signal may be at a low level, to the scan line Sn in synchronization with the scan signal. Then, a voltage of the second power source ELVSS having a high level may be supplied to the power source line VLn during a period when the scan signal Sn is supplied.

Referring to FIGS. 8 and 9, when the scan signal is supplied, e.g., has a low level, to the scan line Sn, the first transistor M1 of the pixel 140*nm* may be turned on. When the control signal is supplied, e.g., has a low level, to the control line CLn, the third transistor M3 of the pixel 140*nm* may be turned on.

The second switching element SW2 may be turned on, e.g., be in a closed state, during a first period T1 during which time the scan signal may be supplied, e.g., has a low level, to the scan line Sn. When the second switching element SW2 is turned on, e.g., be in a closed state, a voltage of the initial power source 181 may be supplied to the gate electrode of the second transistor M2 via the data line Dm and the first transistor M1, and the second transistor M2 may be turned on.

During a second period T2, the second switching element SW2 may be turned off, e.g., be in an open state, and the third switching element SW3 may be turned on, e.g., be in a closed state. When the third switching element SW3 is turned on, a respective voltage applied to the data line Dm may be supplied to the subtracting unit 192 and the voltage sensing unit 193.

As illustrated in FIG. 10, the respective voltage applied to the data line Dm may correspond to the voltage value obtained by subtracting the threshold voltage of the second transistor M2 of the pixel 140*nm* from a voltage of the first power source ELVDD and may gradually increase. When the first transistor M1 and the third transistor M3 of the pixel 140*nm* are turned on, since the second transistor M2 is coupled in the form of a diode, the voltage applied to the data line Dm, i.e., the voltage applied to the gate electrode of the second transistor M2 may increase to the voltage value obtained by subtracting the threshold voltage of the second transistor M2 from the voltage of the first power source ELVDD. When the voltage of the gate electrode of the second transistor M2 increases to the voltage value obtained by subtracting the threshold voltage of the second transistor M2 from the voltage of the first power source ELVDD, the second transistor M2 may be turned off. The second period T2 may be set to have a larger width than the first period T1 so that the gate electrode voltage of the second transistor M2 may sufficiently increase.

The voltage sensing unit 193 may sense the voltage of the data line Dm at predetermined time intervals. When it is determined that a previously sensed voltage is the same as a currently sensed voltage, the control signal may be supplied to the subtracting unit 192. Referring to FIGS. 8, 9A and 10, e.g., the voltage sensing unit 193 may sense the voltage at multiple points in times t0, t1, t2, and the control signal may be supplied to the subtracting unit 192 at the second point in time t2 when it is determined that the previously sensed voltage at the first point in time t1 is the same as the currently sensed voltage at time t2.

The subtracting unit 192 may subtract the voltage supplied from the data line Dm from the voltage of the first power source ELVDD and may supply the subtraction result to the ADC 194 when the control signal is supplied from the voltage sensing unit 193. In embodiments, the voltage corresponding to the threshold voltage of the second transistor M2 may be supplied to the ADC 194.

The ADC 194 may convert the voltage supplied from the subtracting unit 192 into the corresponding second data Data2 and may supply the second data Data2 to the memory 196. The memory 196 may store the second data Data2.

During the sensing period, the above-described processes may be repeated, and the respective second data Data2 extracted from each of the pixels 140 included in the pixel unit 130 may be respectively stored in the memory 196.

Referring to FIG. 9B, during the driving period, a predetermined image may be displayed by the organic light emitting display.

Referring to FIGS. 8 and 9B, during the driving period, the control signal may not be supplied to the control line CLn, e.g., the control signal may have a high level, and the second power source ELVSS having the low level may be supplied to the power source line VLn. During the driving period, the second switching element SW2 and the third switching element SW3 may maintain an off state and the first switching element SW1 maintain an on state.

During the driving period, the respective first data Data1 to be supplied to the pixel 140*nm* and the second data Data2 extracted from the pixel 140*nm* may be supplied to the data driver 120. The first data Data1 may be converted into the corresponding first data signal by the first DAC 124*m* and the second data Data2 may be converted into the corresponding second data signal by the second DAC 127*m*.

The adder 128*m* may add the respective first data signal and the respective second data signal to generate the respective third data signal. The respective third data signal may be supplied to the data line Dm via the first switching element SW1.

When the respective third data signal is supplied to the data line Dm, the first transistor M1 of the pixel 140*nm* may be turned on by the corresponding scan signal supplied to the scan line Sn. Therefore, the respective third data signal supplied to the data line Dm may be supplied to the gate electrode of the second transistor M2 via the first transistor M1 of the pixel 140*nm*.

The storage capacitor Cst of the pixel 140*nm* may be charged with a voltage corresponding to the respective third data signal. Then, the second transistor M2 of the pixel 140*nm* may control the amount of the current supplied from the first power source ELVDD to the second power source ELVSS having a low level via the corresponding OLED based on the voltage stored in the storage capacitor Cst of the pixel 140*nm*.

In embodiments, by employing a third data signal that incorporates a voltage corresponding to a threshold voltage of a driving transistor, e.g., the respective second transistor M2, of each pixel 140, current supplied to a respective OLED of a display may be determined regardless of the threshold voltage of the second transistor M2. Embodiments may thereby display an image with improved and/or completely uniform brightness as compared to conventional displays including pixels having a same and/or a fewer number of transistors.

Figure 11:
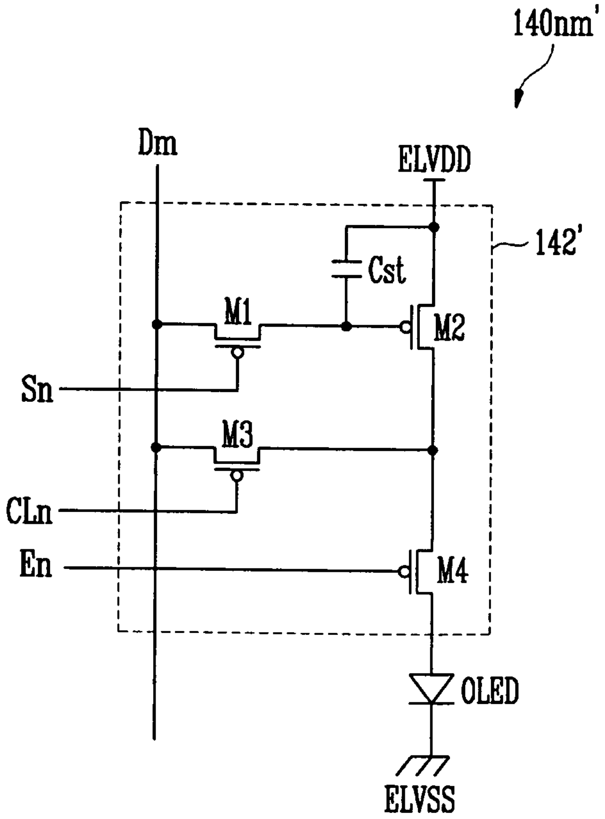
FIG. 11 illustrates a schematic diagram of another exemplary embodiment of a pixel employable by the organic light emitting display of FIG. 1.

FIG. 11 illustrates schematic diagram of another exemplary embodiment of a pixel employable by the organic light emitting display of FIG. 1. In general, only differences between the exemplary pixel 140*nm* of FIG. 2 and the exemplary pixel 140*nm*' of FIG. 11 will be described below.

Referring to FIG. 11, the pixel 140*nm*' may include the OLED and a pixel circuit 142' for supplying current to the OLED.

The pixel circuit 142' may include a fourth transistor M4 coupled between the OLED and the second transistor M2. The fourth transistor M4 may be turned on and turned off to control the coupling between the second transistor M2 and the OLED.

In the exemplary the pixel 140*nm* of FIG. 2, whether current is/is not supplied to the OLED may be controlled based on a voltage level of the second power source ELVSS supplied from the power source line VLn. Thus, in a display employing the pixel 140*nm* of FIG. 2, the display may include the power source line driver 160 to supply respective voltages to the power source lines VL1 to VLn.

In a display (not shown) employing the exemplary pixel 140*nm* of FIG. 11, whether current is supplied to the respective OLED may be controlled using the fourth transistor M4. In such embodiments, the display may not employ the power source line driver 160.

Referring to FIG. 11, a gate electrode of the fourth transistor M4 may be coupled to an emission control line En. In such embodiments, e.g., the scan driver 110 may supply emission control signals to each emission control line E1 to En (not shown), respectively. The fourth transistor M4 may be turned on and turned off based on the respective emission control signal that may be supplied from the scan driver 110.

During the sensing period, the respective emission control signal supplied to the corresponding emission control line En of the display may be set at a voltage at which the fourth transistor M4 may be in an off state, e.g., at a voltage having a high level. During the driving period, the respective emission control signal may be supplied, e.g., set to have a low level voltage, so as to turn on the fourth transistor M4. That is, referring to FIGS. 9A, 9B and 11, during the sensing and driving periods, the corresponding emission control line En may be driven similarly to the corresponding power source line VLn, and may thereby turn on the fourth transistor M4 of the corresponding pixel 140*nm'*.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An organic light emitting display, comprising:

a scan driver adapted to drive scan lines;

a data driver adapted to drive data lines;

pixels positioned between the scan lines and the data lines, each of the pixels including an organic light emitting diode (OLED) and a driving transistor, the driving transistor to control an amount of current that flows from a first power source to a second power source at a low level via the OLED;

an initial power source unit adapted to supply a first voltage different from the voltage of the first power source, the first voltage being a voltage, which when supplied to the driving transistors, turns the driving transistors on;

a switching unit between the data driver and the data lines, the switching unit being adapted to selectively couple the initial power source unit and the data driver to the data lines, the switching unit to couple the first voltage to the data lines during a sensing period and to couple the data driver to the data lines during a driving period;

a timing controller adapted to transmit externally supplied first data to the data driver; and a compensating unit adapted to compensate for variations in threshold voltages of the driving transistors of the pixels, wherein for each pixel:

the compensating unit is to determine the threshold voltage of the driving transistor based on a voltage received from the data line of the pixel during the sensing period, and to store second data corresponding to a threshold voltage of the driving transistor and to transmit the stored second data to the data driver, and wherein the timing controller is adapted to control the scan driver, the data driver, and the compensating unit, and the data driver is adapted to generate a third data signal supplied to the pixels using the first data and the second data.

2. The organic light emitting display as claimed in claim 1, wherein the initial power source unit comprises at least one initial power source adapted to supply the first voltage.

3. The organic light emitting display as claimed in claim 1, wherein the compensating unit comprises:

first switching elements coupled to the data lines;

at least one voltage sensing unit coupled to the first switching elements, the voltage sensing unit being adapted to sense a voltage applied to the data lines;

at least one subtracting unit coupled to the first switching elements and the voltage sensing unit, the subtracting unit being adapted to subtract the voltage applied to the data lines from the first power source when a control signal is input from the voltage sensing unit;

an analog digital converter (ADC) adapted to convert a voltage supplied from the subtracting unit into second data; and a memory adapted to store the second data from the ADC.

4. The organic light emitting display as claimed in claim 3, wherein the first switching elements are turned on during a portion of a sensing period when the second data is stored and are turned off during a driving period when a respective predetermined gray scale is displayed by the pixels.

5. The organic light emitting display as claimed in claim 4, wherein the organic light emitting display is adapted to perform at least one sensing period before the organic light emitting display displays an image based on the externally supplied first data.

6. The organic light emitting display as claimed in claim 3, wherein the voltage sensing unit is adapted to sense the voltage applied to the data lines at predetermined points in time and, when a voltage sensed at a previous point of time and a voltage sensed at a current point of time are determined to be a same voltage value, and to generate the control signal.

7. The organic light emitting display as claimed in claim 3, wherein the subtracting unit is adapted to subtract the voltage applied to the data lines from a voltage of the first power source and to supply the threshold voltage of the respective driving transistor to the ADC.

8. The organic light emitting display as claimed in claim 3, wherein the second data corresponding to the pixels is stored in the memory during the sensing period.

9. The organic light emitting display as claimed in claim 8, wherein the memory is adapted to supply the second data to the data driver in units of horizontal lines corresponding to the control of the timing controller.

10. The organic light emitting display as claimed in claim 3, further comprising:

control lines extending parallel with the scan lines and being controlled by the scan driver; and power source lines extending parallel with the scan lines and being controlled by a power source line driver.

11. The organic light emitting display as claimed in claim 10, wherein the scan driver is adapted to sequentially supply respective scan signals to the scan lines during a sensing period when the second data is stored and during a driving period when a predetermined gray scale is respectively displayed by the pixels, and to sequentially supply respective control signals to the control lines during the sensing period in synchronization with the scan signals.

12. The organic light emitting display as claimed in claim 11, wherein the scan driver is adapted to not supply the control signals during the driving period.

13. The organic light emitting display as claimed in claim 11, wherein the power source line driver is adapted to supply a voltage of a second power source having a high level to the power source lines during the sensing period and to supply a voltage of the second power source having a low level to the power source lines during the driving period.

14. The organic light emitting display as claimed in claim 13, wherein the voltage of the second power source at the high level is set to prevent current flow to the OLED.

15. The organic light emitting display as claimed in claim 14, wherein the voltage of the second power source at the high level is set to have a same voltage value as the first power source.

16. The organic light emitting display as claimed in claim 11, wherein the switching unit comprises: second switching elements coupled between the data lines and the data driver; and third switching elements coupled between the data lines and the initial power source unit.

17. The organic light emitting display as claimed in claim 16, wherein the second switching elements are turned off during the respective sensing period and are turned on during the respective driving period.

18. The organic light emitting display as claimed in claim 16, wherein the third switching elements are turned on during a first period of the respective sensing period during a period when the respective scan signal is supplied and are turned off during the driving period.

19. The organic light emitting display as claimed in claim 18, wherein the first switching elements are turned on during a second period of the respective sensing period, excluding the first period, when the respective scan signal is supplied.

20. The organic light emitting display as claimed in claim 19, wherein the second period is set to have a larger width than the first period.

21. The organic light emitting display as claimed in claim 11, wherein each of the pixels comprises:

a first transistor including a first terminal coupled the corresponding data line and a second terminal coupled to the driving transistor, the first transistor being turned on when a scan signal is supplied to the corresponding scan line;

a third transistor coupled between the corresponding data line and a common terminal of the driving transistor and the OLED and being turned on when a control signal is supplied to the corresponding control line; and a storage capacitor coupled between a gate electrode of the driving transistor and the first power source, wherein the driving transistor is coupled between the first power source and the OLED so that the gate electrode of the driving transistor is coupled to a second electrode of the first transistor.

22. The organic light emitting display as claimed in claim 3, further comprising control lines and emission control lines extending parallel to the scan lines and controlled by the scan driver.

23. The organic light emitting display as claimed in claim 22, wherein the scan driver is adapted to sequentially supply scan signals to the respective scan lines during a sensing period when the second data is stored and during a driving period when a respective predetermined gray scale is displayed by the pixels and to sequentially supply emission control signals to the emission control lines during the sensing period in synchronization with the scan signals.

24. The organic light emitting display as claimed in claim 23, wherein each of the pixels comprises:

a first transistor including a first terminal coupled the corresponding data line and a second terminal coupled to the driving transistor, the first transistor being turned on when a scan signal is supplied to the corresponding scan line;

a third transistor coupled between the data line and a common terminal of the driving transistor, the third transistor being turned on when a control signal is supplied to the control line;

a fourth transistor coupled between the common terminal of the driving transistor and the OLED, the fourth transistor being turned off when an emission control signal is supplied to the corresponding emission control line, and being turned on when the emission control signal is not supplied; and a storage capacitor coupled between a gate electrode of the driving transistor and the first power source, wherein the driving transistor is coupled between the first power source and the OLED so that the gate electrode of the driving transistor is coupled to a second electrode of the first transistor.

25. The organic light emitting display as claimed in claim 1, wherein the data driver comprises:

a first signal generating unit adapted to generate a first data signal using the first data;

a second signal generating unit adapted to generate a second data signal using the second data; and an adding unit adapted to add corresponding ones of the first data signal and the second data signal and to generate the third data signal, respectively.

26. The organic light emitting display as claimed in claim 25, wherein the first data signal generated from the first data to be supplied to a respective pixel and the second data signal generated by the second data extracted from the respective pixel are added by the adding unit.

27. The organic light emitting display as claimed in claim 25, wherein the data driver further comprises:

a shift register unit adapted to sequentially generate sampling signals;

a first sampling latch unit adapted to store the first data based on the sampling signals;

a second sampling latch unit for storing the second data based on the sampling signals;

a first holding latch unit adapted to simultaneously receive and store the first data stored in the first sampling latch unit and to supply the stored first data to the first signal generating unit; and a second holding latch unit adapted to simultaneously receive and store the second data stored in the second sampling latch unit and to supply the stored second data to the second signal generating unit.

28. The organic light emitting display as claimed in claim 25, wherein the data driver further comprises a buffer unit coupled between the adding unit and the data lines, the buffer unit being adapted to supply the respective third data signal to the data lines.

29. The organic light emitting display as claimed in claim 1, wherein the compensating unit is to store the second data corresponding to the threshold voltage of the driving transistor.

30. The organic light emitting display as claimed in claim 1, wherein the first voltage output from the initial power source unit is a voltage that is less than a difference between the first power source and the threshold voltage of the driving transistor.

31. The organic light emitting display as claimed in claim 1, wherein the compensating unit includes a sensing circuit to detect when the voltage received from the data line is substantially constant for a predetermined period of time, the compensating unit to determine the threshold voltage of the driving transistor based on a signal from the sensing circuit and the voltage received from the data line.

* * * * *